United States Patent
Yun et al.

(10) Patent No.: US 7,583,738 B2
(45) Date of Patent: Sep. 1, 2009

(54) APPARATUS AND METHOD FOR REDUCING PEAK-TO-AVERAGE POWER RATIO IN ORTHOGONAL FREQUENCY DIVISION MULTIPLEXING COMMUNICATION SYSTEM

(75) Inventors: Sung-Ryul Yun, Suwon-si (KR); Sung-Eun Park, Seoul (KR); Jae-Yoel Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 570 days.

(21) Appl. No.: 11/111,217

(22) Filed: Apr. 21, 2005

(65) Prior Publication Data

US 2005/0238110 A1 Oct. 27, 2005

(30) Foreign Application Priority Data

Apr. 23, 2004 (KR) .................. 10-2004-0028073

(51) Int. Cl.
*H04K 1/10* (2006.01)
(52) U.S. Cl. .................. 375/260; 370/206; 370/208; 370/210; 370/236; 370/342; 370/343; 370/366; 370/480; 375/296; 375/135
(58) Field of Classification Search ........... 375/260
See application file for complete search history.

(56) References Cited

U.S. PATENT DOCUMENTS

2002/0094018 A1* 7/2002 Terao .................. 375/147
2002/0105947 A1* 8/2002 Kitagawa et al. ........... 370/366

OTHER PUBLICATIONS

Sung-Eun Park et al., Tone Reservation Method for PAPR Reduction Scheme, Oct. 31, 2003.

* cited by examiner

*Primary Examiner*—Shuwang Liu
*Assistant Examiner*—Dhaval Patel
(74) *Attorney, Agent, or Firm*—The Farrell Law Firm, LLP (57) ABSTRACT

Provided is a method for reducing a PAPR (Peak-to-Average Power Ratio) of a transmit signal in a broadband wireless communication. The method includes the steps of: assigning information signals to remaining tones except L reserved tones that are previously appointed among N tones, and performing an IFFT operation on the tones; detecting peaks that are greater than a predefined reference value from the IFFT-ed signal; generating signals for removing the detected peaks using P-waveform having impulse characteristic, the P-waveform being produced using the L reserved tones; generating a clipping signal by accumulating the signals; and simultaneously removing the peaks by adding the IFFT-ed signal and the clipping signal.

13 Claims, 8 Drawing Sheets

APPARATUS AND METHOD FOR REDUCING PEAK-TO-AVERAGE POWER RATIO IN ORTHOGONAL FREQUENCY DIVISION MULTIPLEXING COMMUNICATION SYSTEM

PRIORITY

This application claims priority under 35 U.S.C. § 119 to an application entitled "APPARATUS AND METHOD FOR REDUCING PEAK-TO-AVERAGE POWER RATIO IN ORTHOGONAL FREQUENCY DIVISION MULTIPLEXING COMMUNICATION SYSTEM" filed in the Korean Intellectual Property Office on Apr. 23, 2004 and assigned Ser. No. 2004-0028073, the contents of which are incorporated herein by reference.

BACKGROUND OF THE INVENTION

1. Field of the Invention

The present invention relates to an apparatus and method for reducing a peak-to-average power ratio (PAPR) in an Orthogonal Frequency Division Multiplexing (OFDM) communication system, and more particularly, to an apparatus and method for reducing a PAPR in an OFDM communication system, in which peaks are reduced below a target power value in an Inverse Fast Fourier Transformation (IFFT) signal when a tone reservation scheme using a gradient algorithm is performed.

2. Background of the Prior Art

In the late 1970's, a cellular mobile telecommunication system was introduced into the United States of America. Since then, a voice communication service was developed in an Advanced Mobile Phone Service (AMPS), known as the 1st Generation (1G) analog mobile telecommunication system. In the mid 1990's, the 2nd Generation (2G) mobile telecommunication system. In the late 1990's, the 3rd Generation (3G) mobile telecommunication system and International Mobile Telecommunication-2000 (IMT-2000) were developed. Both provided advanced wireless multimedia service and a high-speed data service.

Currently, the 3G mobile telecommunication system is evolving to a 4th Generation (4G) mobile telecommunication system. The 4G mobile telecommunication system is currently under the standardization process to integrate service between a wired communication network and a wireless communication network beyond the simple wireless communication service that the previous-generation mobile telecommunication systems provide. In addition, the 4G mobile telecommunication system provides data transmission at higher speeds than the 3G mobile telecommunication system.

When mobile telecommunication systems transmit signals over wireless channels, multi-path interference occurs from various obstacles between the transmitter and the receiver.

The wireless channels where the multi-paths exist are characterized by maximum channel delay spread and signal transmission period. When the signal transmission period is longer than the maximum channel delay spread, interference does not occur in consecutive signals, and frequency characteristics of the channel are given by a frequency nonselective fading.

If a single carrier transmission is used in high-speed data transmission with a short symbol period, an Inter Symbol Interference (ISI) results and distortion increases. Consequently, complexity of a receiver equalizer increases.

To solve the equalization problem in single carrier transmission, the Orthogonal Frequency Division Multiplexing (OFDM) was developed.

The OFDM is a kind of multi-carrier modulation (MCM), in which a serial symbol sequence is converted into parallel symbol sequences and modulated into a plurality of mutually orthogonal sub-carriers, that is, a plurality of sub-carrier channels.

The MCM system was applied to a military high frequency (HF) radio communication for the first time in the late 1950's. The OFDM with overlapping orthogonal sub-carriers was initially developed in the 1970's, but it was difficult to implement the orthogonal modulation between multi-carriers. Therefore, the OFDM had a limitation in practical system implementation. In 1971, Weinstein et al. proposed an OFDM scheme that applies a Discrete Fourier Transform (DFT) to the parallel data transmission as an efficient modulation/demodulation process, which was a driving force behind the development of the OFDM. Also, the use of a guard interval, and a cyclic prefix as a guard interval, further mitigated adverse effects of the multi-path propagation and the delay spread on the systems.

The OFDM has been widely used for digital data communications such as Digital Audio Broadcasting (DAB), digital TV broadcasting, Wireless Local Area Network (WLAN), and Wireless Asynchronous Transfer Mode (WATM). Although hardware complexity was an obstacle to widespread use of OFDM, recent advances in digital signal processing technology, including a Fast Fourier Transform (FFT) and an Inverse Fast Fourier Transform (IFFT), enabled the practical implementation of the OFDM.

The OFDM, similar to a Frequency Division Multiplexing (FDM), provides optimum transmission efficiency in a high-speed data transmission because it transmits data on sub-carriers while maintaining an orthogonality among them. The overlapping use of frequency spectrums is more efficient and is more robust against multi-path fading.

The OFDM reduces the effects of the ISI by use of the guard intervals. In addition, the structure of the equalizer is simplified. OFDM is increasingly popular in communication systems because it is robust against impulse noise.

A conventional OFDM mobile communication system will be described below with reference to FIG. 1, which is a block diagram of a transmitter and a receiver in a conventional OFDM mobile communication system.

Figure 1:
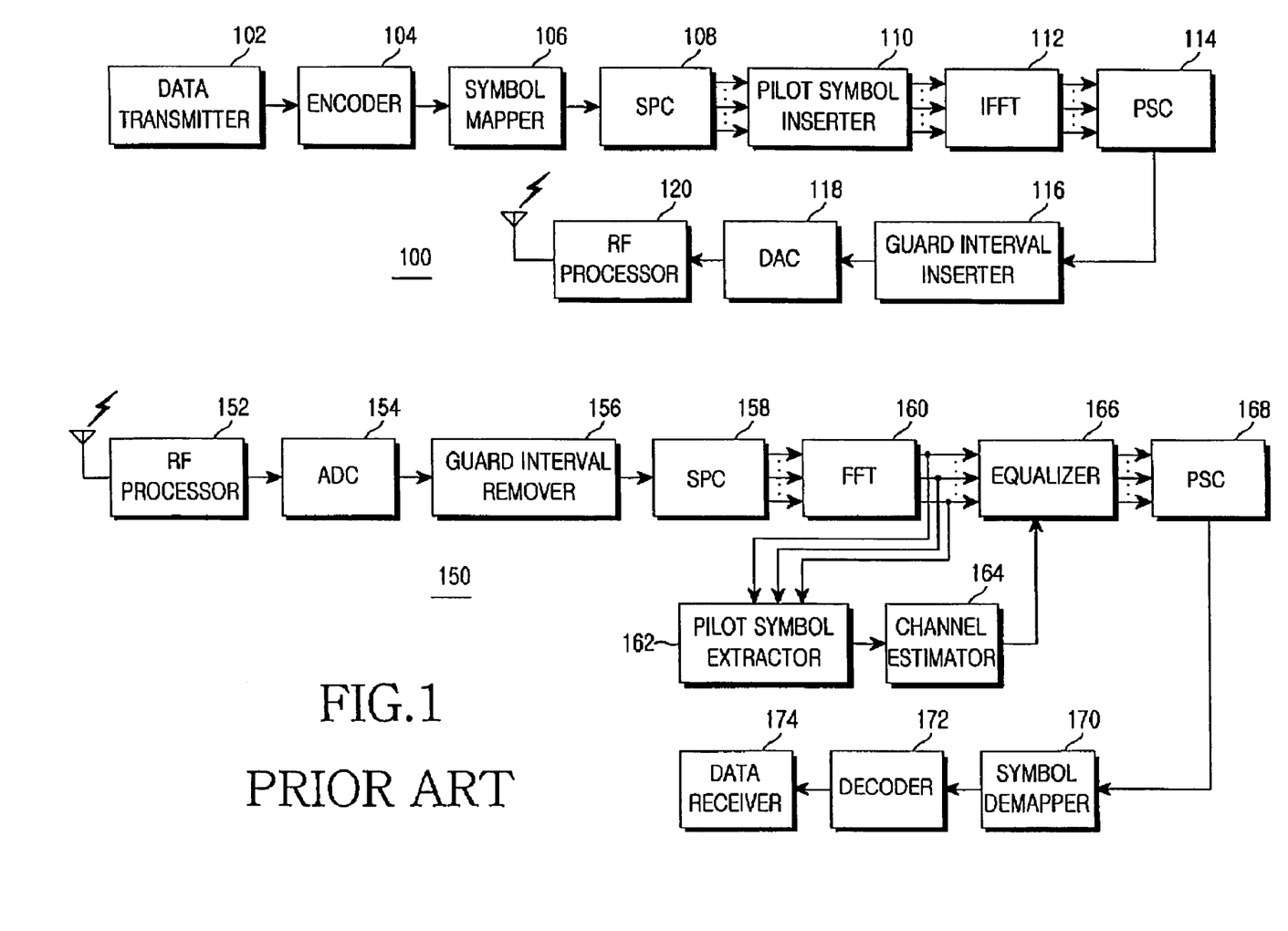
FIG. 1 is a block diagram of a transmitter and a receiver in a general OFDM communication system.

Referring to FIG. 1, the transmitter 100 includes a data transmitter 102, an encoder 104, a symbol mapper 106, a serial to parallel converter (SPC) 108, a pilot symbol inserter 110, an IFFT unit 112, a parallel to serial converter (PSC) 114, a guard interval inserter 116, a digital to analog converter (DAC) 118, and an RF processor 120.

In addition, the receiver 150 includes an RF processor 152, an analog to digital converter (ADC) 154, a guard interval remover 156, a serial to parallel converter (SPC) 158, an FFT unit 160, a pilot symbol extractor 162, a channel estimator 164, an equalizer 166, a parallel to serial converter (PSC) 168, a symbol demapper 170, a decoder 172, and a data receiver 174.

In the transmitter 100, the data transmitter 102 generates user data bits and control data bits to be transmitted. The encoder 104 encodes the data bits in accordance with a predetermined coding scheme and outputs the coded bits to the symbol mapper 106. The coding scheme can be, but is not limited to, a turbo coding or a convolutional coding with a predetermined coding rate.

The symbol mapper 106 modulates the coded bits in accordance with a predetermined modulation scheme and produces serial modulation symbols to the serial to parallel converter 108. The modulation scheme can be, but is not limited to, a Binary Phase Shift Keying (BPSK), a Quadrature Phase Shift Keying (QPSK), a 16 Quadrature Amplitude Modulation (16QAM), or a 64 Quadrature Amplitude Modulation (64QAM). The serial to parallel converter 108 converts the serial modulation symbols into parallel modulation symbols, which are inputted to the pilot symbol inserter 110.

The pilot symbol inserter 110 inserts pilot symbols into the parallel modulation symbols and outputs the pilot-inserted parallel modulation symbols to the IFFT unit 112. The IFFT unit 112 performs an N-point IFFT operation on the signals from the pilot symbol inserter 110 and outputs the resultant signals to the parallel to serial converter 114.

The parallel to serial converter 114 performs a parallel to serial conversion on the signals from the IFFT unit 112 and outputs the serial-converted signals to the guard interval inserter 116. The guard interval inserter 116 inserts a guard interval into the serial-converted signals and outputs the guard interval-inserted signals to the digital to analog converter 118. The guard interval is inserted to cancel interference between a previous OFDM symbol and a current OFDM symbol. The guard interval can be inserted in a form of null data having a predetermined interval. In such a case, however, interference between the sub-carriers occurs when a receiver incorrectly estimates a start point of the OFDM symbol. Thus, the probability of misjudging the received OFDM symbol increases. Accordingly, the guard interval is inserted in the form of a cyclic prefix or a cyclic postfix. In the case of a cyclic prefix, a predetermined number of last bits of a time-domain OFDM symbol are copied and inserted before an effective OFDM symbol. In the case of a cyclic postfix, a predetermined number of first bits of a time-domain OFDM symbol are copied and inserted after an effective OFDM symbol.

The digital to analog converter 118 converts the guard interval-inserted signals from the guard interval inserter 116 into analog signals, which are inputted to the RF processor 120. The RF processor 120, including a filter (not shown) and a front end unit (not shown), performs an RF process on the analog signals such that the RF signals can be transmitted through a transmit antenna (Tx antenna) over air. The transmitted signals from the transmitter 150 experience multi-path channels and noisy environments. The transmitted signals are received through a receive antenna (Rx antenna) of the receiver 150.

In the receiver 150, the RF processor 152 down-converts the signals received through the Rx antenna into an intermediate frequency (IF) signals, which are inputted to the analog to digital converter 154. The analog to digital converter 154 converts the analog signals from the RF processor 152 into digital signals, which are inputted to the guard interval remover 156.

The guard interval remover 156 removes the guard interval from the digital signals and outputs the guard interval-removed signals to the serial to parallel converter (SPC) 158. The serial to parallel converter 158 converts the serial signals outputted from the guard interval remover 156 into parallel signals. The FFT unit 160 performs an N-point FFT operation on the parallel signals and outputs the resulting signals to the equalizer 166 and the pilot symbol extractor 162.

The pilot symbol extractor 162 detects pilot symbols from the output signals of the FFT unit 160 and outputs the detected pilot symbols to the channel estimator 164. The channel estimator 164 performs a channel estimation using the pilot symbols outputted from the pilot symbol extractor 162 and transmits the channel estimation result to the equalizer 166. The receiver 150 generates a Channel Quality Information (CQI) corresponding to the channel estimation result and outputs the CQI to the transmitter 100 through a CQI transmitter (not shown).

The equalizer 166 performs channel equalization on the output signals of the FFT unit 160 by using the channel estimation result and outputs the channel-equalized signals to the parallel to serial converter 168. The parallel to serial converter 168 converts the parallel signals from the equalizer 166 into serial signals, and outputs the serial signals to the symbol demapper 170.

The symbol demapper 170 demodulates the serial signals outputted from the parallel to serial converter 168 in accordance with a predetermined demodulation scheme and outputs the demodulated signals to the decoder 172. The decoder 172 decodes the demodulated signals in accordance with a predetermined decoding scheme. Here, the demodulation scheme and the decoding scheme correspond to the modulation scheme and the coding scheme that are applied to the transmitter, respectively.

In spite of the above advantages, the OFDM communication system has a drawback in that it has a high Peak-to-Average Power Ratio (PAPR) due to the multi-carrier modulation. That is, since the OFDM communication system transmits data using multi-carriers, amplitude of the final OFDM signal is the summation of amplitudes of the respective carriers, so the amplitude changes greatly. Further, if all the carriers are in phase, the final OFDM signal will have very large amplitude. As a result, the amplitude of the final OFDM signal is out of a linear dynamic range of a high power amplifier configured within the RF processor 120, making the output signal of the high power amplifier distorted. To obtain a maximum output power, the high power amplifier must operate a device in a nonlinear region. However, due to the distortion, the high power amplifier reduces input power and operates the device in a linear region. This is called a back-off method.

The back-off method decreases the operating point of the high power amplifier to reduce signal distortion. As the back-off value increases, power consumption increases as well, degrading high power amplifier efficiency. The signal with high PAPR degrades the linear amplifier efficiency, and the nonlinear distortion occurs because the operating point is in the nonlinear region. Further, inter-modulation between the carriers and spectrum radiation also result.

In the OFDM communication system, the PAPR can be reduced using a clipping scheme, a block-coding scheme, a phase adjustment scheme, or a tone reservation (TR) scheme.

The clipping scheme determines a predetermined clipping value as a reference value depending on the linear dynamic range of the amplifier and clips the amplitude of a signal above the predetermined clipping value. In the clipping scheme, however, in-band distortion occurs due to nonlinear operation, thus causing inter symbol interference and increasing bit error rate. In addition, channel interference occurs from out-band clipping noise, degrading spectral efficiency.

The block-coding scheme transmits data in a way of adding a coding scheme to spare carriers to reduce the PAPR of all the carriers. The block-coding scheme can correct an error through the coding scheme and reduce the PAPR without any signal distortion. However, when the number of sub-carriers is large, spectral efficiency degrades and the size of a look-up table or generation matrix becomes large. Thus, the complexity and the amount of computation in the block coding scheme increase.

The phase adjustment scheme includes a Partial Transmit Sequence (PTS) scheme and a selective mapping (SLM) scheme.

The PTS scheme performs an L-point IFFT operation on M sub-blocks divided from input data, multiplies the sub-blocks by phase factors to minimize the PAPR, and then transmits data. However, the PTS scheme must perform the IFFT as often as the number (M) of the sub-blocks. Thus, as the number (M) of the sub-blocks increases, the increasing computation of the phase factors prevents high-speed data transmission.

The SLM scheme multiplies M identical data blocks by different phase sequences of a statistically independent N length, and outputs the result with the lowest PAPR. Although the SLM requires M times IFFT operations, it can greatly reduce PAPR and can be used with any number of carriers.

The PTS scheme and the SLM scheme have a drawback in that they must transmit additional information of rotation factors to the receiver to modulate data. In other words, since additional information must be exchanged between the transmitter and the receiver, the communication scheme becomes complex. In addition, when an error occurs in the additional information, an error also occurs in all information of the corresponding OFDM symbol, leading to damage of the OFDM symbol.

The TR scheme that reduces the PAPR by assigning some tones that do not transmit data among the sub-carriers. The receiver ignores the tones that do not transmit information signals, and modulates information signals only from the remaining tones. Thus, the configuration of the receiver can be simplified.

A gradient algorithm is typical among the TR schemes. In the gradient algorithm, the clipping scheme is applied to the TR scheme. A signal having an impulse characteristic is generated using a tone that does not transmit information signal, and an output signal of the IFFT unit is then clipped using the signal having the impulse characteristic. When the output signal of the IFFT unit is clipped using the signal having the impulse characteristic, data distortion occurs only in the tones that do not transmit information signals, while it does not occurs in frequency domain.

The TR scheme using the gradient algorithm will now be described. Herein, the terms "tone" and "sub-carrier" will be used as the same meaning.

Figure 2:
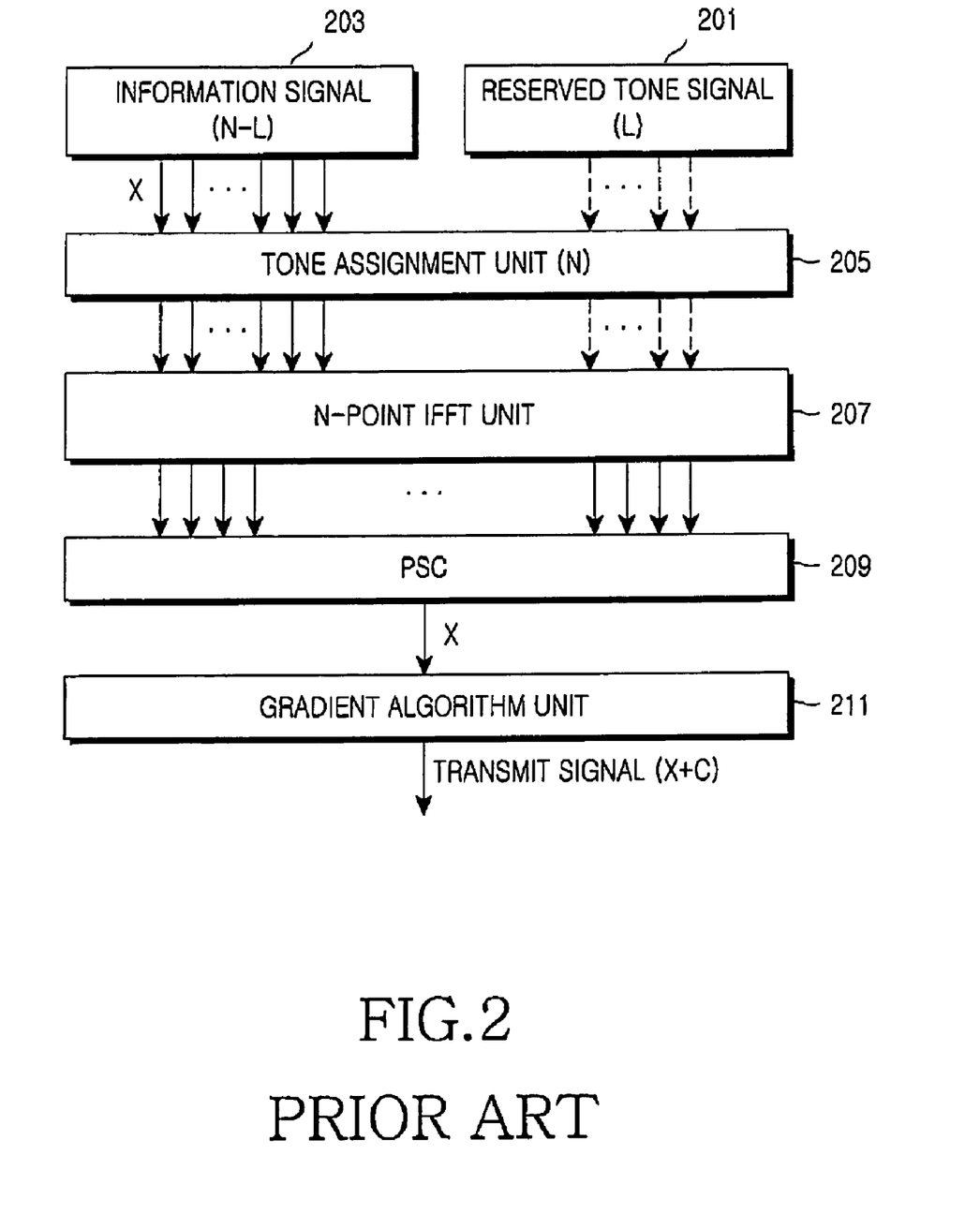
FIG. 2 is a block diagram of a conventional transmitter using a tone reservation scheme.

FIG. 2 is a block diagram illustrating a structure of a transmitter that employs a conventional TR scheme. Hereinafter, the user data bits and the control data bits, which have been described with reference to FIG. 1, will be referred to as "information signals". A total of N sub-carriers are divided into L tones to which the information signals are not assigned and (N−L) tones to which the information signals are assigned. In the gradient algorithm, a waveform having an impulse characteristic is produced using the L tones that do not transmit the information signals, and an output signal of the IFFT unit 112 is clipped using the waveform, thereby reducing the PAPR. Hereinafter, the tones to which the information signals are not assigned, that is, the tones to which "null" is assigned, will be referred to as "reserved tones". The reserved tones are determined by randomly selecting one or more tones among the N tones, performing several hundred thousand to million times the operation of producing the impulse waveform, and combining the tones having the most ideal impulse waveform. In FIG. 2, the reserved tone signals inputted to a tone assignment unit 205 are indicated by dotted lines so as to represent that there are no actually inputted signals.

Referring to FIG. 2, when X(=N−L) information signals 203 are inputted to the tone assignment unit 205, the tone assignment unit 205 assigns the inputted information signals 203 to the remaining tones except the L reserved tones 201. That is, the tone assignment unit 205 outputs the information signals to the previously appointed inputs among the N inputs (positions of the N sub-carriers) of the IFFT unit 207. At this point, no signals are inputted to the positions of the L sub-carriers corresponding to the reserved tones. This relationship can be expressed as Equation (1):

$$X_k = \begin{cases} X_k, & k \notin \{i_1, i_2, \ldots, i_L\} \\ 0, & k \in \{i_1, i_2, \ldots i_L\} \end{cases} \quad (1)$$

where, k represents the positions of the sub-carriers, and the set represents the positions of the L sub-carriers corresponding to the reserved tones.

As expressed in Equation 1, null signals are assigned to the L reserved tones and the information signals are assigned to the remaining tones. Here, the L reserved tones (positions of the L sub-carriers) are previously appointed between the transmitter and the receiver in an initial transmission and do not change during data transmission.

The N-point IFFT unit 207 performs an N-point IFFT operation on the X(=N−L) input signals inputted from the tone assignment unit 205, and outputs the resulting IFFT operation values to a parallel to serial converter 209. The parallel to serial converter 209 converts the IFFT operation values from serial to parallel and outputs the resulting values to a gradient algorithm unit 211. The gradient algorithm unit 211 reduces the PAPR of the output signals of the parallel to serial converter 209 by using P-waveform that is produced by the L reserved tones. The output signal of the gradient algorithm unit 211 becomes a signal x+c produced by adding the output signal x of the IFF unit 207 to the signal c produced using the P-waveform. A detailed structure of the gradient algorithm unit 211 is illustrated in FIG. 3.

The conventional gradient algorithm will be described below with reference to FIG. 3.

Figure 3:
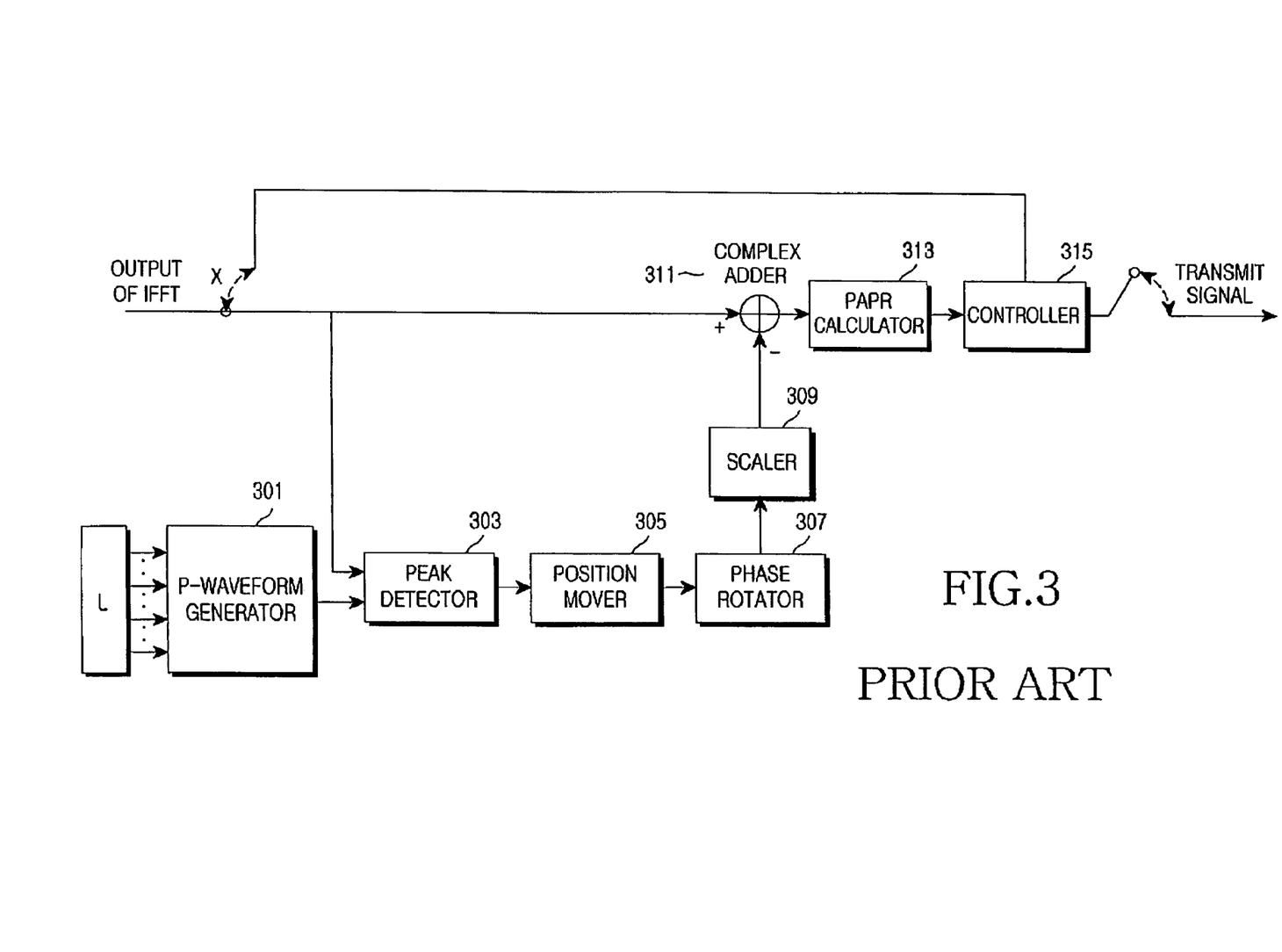
FIG. 3 is a block diagram of a gradient algorithm unit shown in FIG. 2.

Referring to FIG. 3, the gradient algorithm unit 211 includes a P-waveform generator 301, a peak detector 303, a position mover 305, a phase rotator 307, a scaler 309, a complex adder 311, a PAPR calculator 313, and a controller 315.

The P-waveform generator 301 generates the P-waveform having the impulse characteristic by using the reserved tones. As described above, the reserved tones are determined by randomly selecting one or more tones among the N tones, performing several hundred thousand to million times the operation of producing the impulse waveform, and selecting a combination of the tones having the most ideal impulse waveform.

The peak detector 303 detects a maximum peak of the signal x outputted from the parallel to serial converter 209. The position mover 305 moves the peak of the P-waveform to the position of the detected maximum peak. The phase rotator 307 matches a phase of the moved P-waveform with a phase of the maximum peak detected on a complex plane. The scaler 309 scales the P-waveform outputted from the phase rotator 307 depending on magnitude of the maximum peak, and then outputs the signal c. Here, the signal c is a calculated value that is optimized to remove the maximum peak of the signal x outputted from the IFFT unit 207.

The adder 311 outputs the signal x+c by complex addition of the signal x and the signal c, which are respectively outputted from the IFFT unit 207 and the scaler 309. The PAPR calculator 313 calculates the PAPR of the signal x+c outputted from the adder 311. The controller 315 compares the calculated PAPR with a predefined target PAPR. When the calculated PAPR is greater than the target PAPR, the signal x+c is fed back to the peak detector 303 so as to repeat the gradient algorithm. On the contrary, when the calculated PAPR is less than the target PAPR, the signal x+c is outputted as a transmit signal.

The above procedures are repeated until the PAPR of the transmit signal is below the predefined target PAPR. To prevent an infinite repetition, the system sets the maximum number of times of repetition. Accordingly, when the above procedures are repeated the set number of times, the signal is outputted even though the PAPR of the transmit signal is not below the target PAPR. For example, when the target PAPR is 8 dB, the repetitive procedure stops when the PAPR reaches 8 dB or below. When the procedure reaches the set number of repetition times, the signal corresponding to the last PAPR is outputted as the transmit signal.

Similarly, the conventional gradient algorithm searches the maximum peak among the time-domain sample values and reduces it to below the target level. If several peaks exceeding the target level occur, the number of times of the repetition of the algorithm increases. Consequently, computation complexity and processing time also increase.

SUMMARY OF THE INVENTION

The present invention provides an apparatus and method for reducing PAPR of a transmit signal in an OFDM mobile communication system.

In addition, the present invention provides an apparatus and method for reducing an operation time when PAPR is reduced using a TR scheme in an OFDM mobile communication system.

Further, the present invention provides an apparatus and method for reducing an operation time when a TR scheme using a gradient algorithm is executed in an OFDM mobile communication system.

Still further, the present invention provides an apparatus and method for simultaneously reducing peaks of above a target PAPR to below the target PAPR in an IFFT-ed signal when a TR scheme using a gradient algorithm is executed.

According to an aspect of the present invention, an apparatus for reducing a PAPR (Peak-to-Average Power Ratio) of a transmit signal in a broadband wireless communication system includes a tone assignment unit for assigning information signals to remaining tones except L reserved tones that are previously appointed among N tones; an IFFT (Inverse Fast Fourier Transform) unit for performing an IFFT operation on the L tones to which the information signals are not assigned and the (N−L) tones to which the information signals are assigned; and a multi-gradient algorithm unit for detecting peaks that are greater than a predefined reference value from the output signal of the IFFT unit, accumulatively storing signals having impulse characteristic for removing the detected peaks, and simultaneously removing the peaks by adding the accumulatively stored signal to the output signal of the IFFT unit.

Preferably, the multi-gradient algorithm unit includes a peak detector for detecting the peaks that are greater than the predefined reference value from the IFFT unit; a position mover for moving a peak of a P-waveform having an impulse characteristic to positions of the detected peaks, the P-waveform being produced using the L reserved tones; a phase rotator for matching phases of the P-waveforms from the position mover with phases of the corresponding detected peaks; a scaler for scaling the P-waveforms outputted from the phase rotator depending on magnitudes of the corresponding peaks; an accumulator for accumulating the P-waveforms outputted from the scaler and generating clipping signals for removing the detected peaks; and an adder for simultaneously removing the peaks by complex addition of the clipping signals from the accumulator and the output signals of the IFFT unit.

According to another aspect of the present invention, a method for reducing a PAPR (Peak-to-Average Power Ratio) of a transmit signal in a broadband wireless communication includes assigning information signals to remaining tones except L reserved tones that are previously appointed among N tones; performing an IFFT operation on the L tones to which the information signals are not assigned and the (N−L) tones to which the information signals are assigned; and detecting peaks that are greater than a predefined reference value from the IFFT-ed signal, accumulatively storing signals having impulse characteristic for removing the detected peaks, and removing the peaks by adding the accumulatively stored signal to the IFFT-ed signal.

Preferably, the step of removing the peaks includes detecting the peaks that are greater than the predefined reference value from the IFFT-ed signal; generating a plurality of P-waveforms by moving peaks of a P-waveform having an impulse characteristic to positions of the detected peaks, the P-waveform being produced using the L reserved tones; matching phases of the plurality of moved P-waveforms with phases of the corresponding detected peaks; scaling the plurality of phase-matched P-waveforms depending on magnitudes of the corresponding peaks; accumulating the plurality of scaled P-waveforms and generating clipping signals for simultaneously removing the detected peaks; and removing the detected peaks by complex addition of the clipping signals and the IFFT-ed signal.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. A detail description of well-known features will be omitted for conciseness.

Hereinafter, an apparatus and method for reducing a PAPR of a transmit signal in an OFDM communication system will be described in detail. In particular, there will be provided an apparatus and method for simultaneously reducing peaks to below a target PAPR in an IFFT-ed signal when a tone reservation (TR) scheme using a gradient algorithm is executed. The technique of simultaneously reducing the peaks having more than the target PAPR in the transmit signal will be referred to as a "multi-gradient algorithm".

Figure 4:
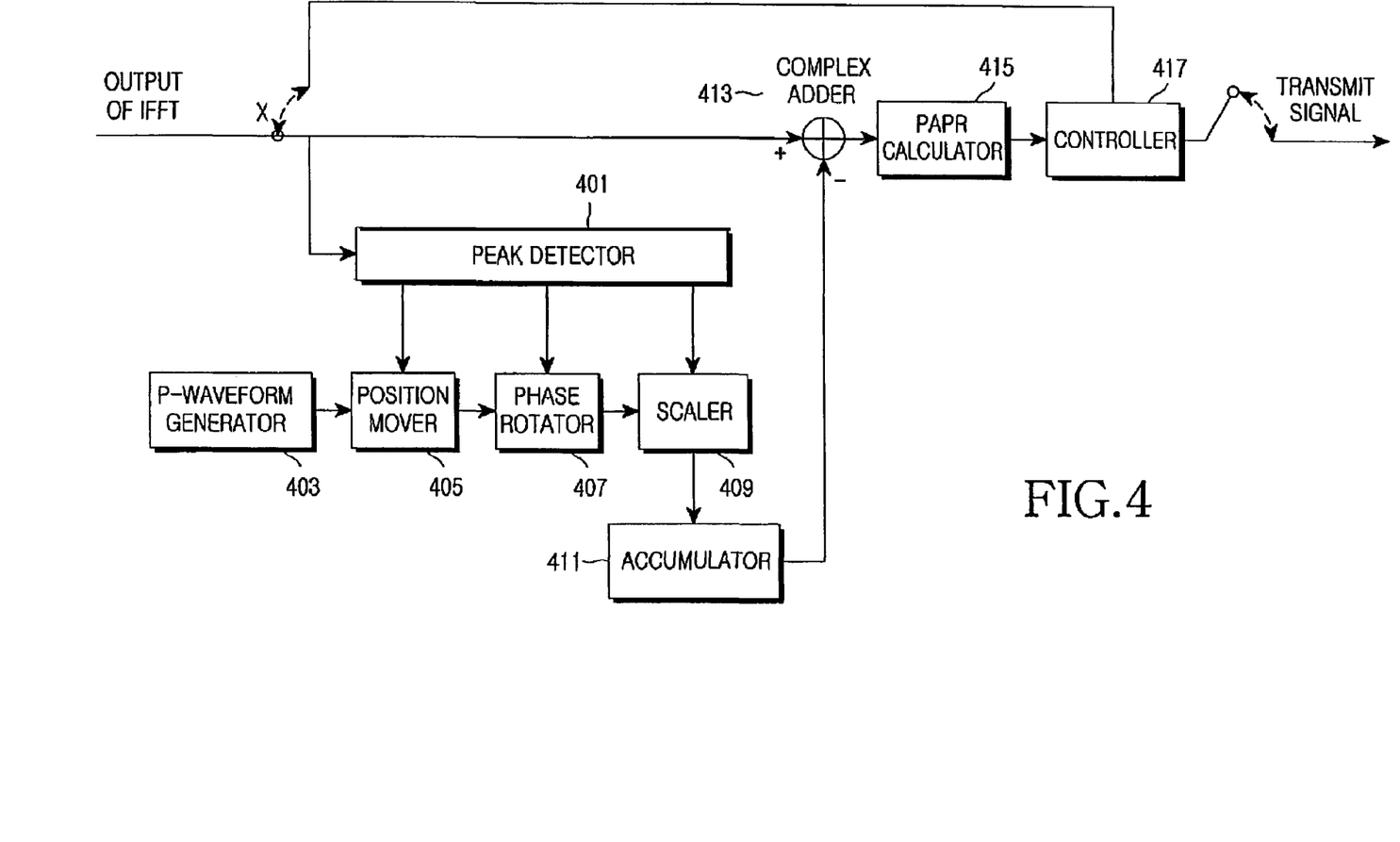
FIG. 4 is a block diagram of a multi-gradient algorithm unit according to an embodiment of the present invention.

FIG. 4 is a block diagram of an apparatus for executing a multi-gradient algorithm according to an embodiment of the present invention. The apparatus of FIG. 4 corresponds to the gradient algorithm unit 211 of FIG. 2. For distinction from the prior art, the apparatus of FIG. 4 will be referred to as a "multi-gradient algorithm unit". Although signals x, c and x+c and P-waveform will be described as waveforms for the sake of convenience, it should be noted that they are sample values of sampled waveforms.

Referring to FIG. 4, the multi-gradient algorithm unit includes a peak detector 401, a P-waveform generator 403, a position mover 405, a phase rotator 407, a scaler 409, an accumulator 411, a complex adder 413, a PAPR calculator 415, and a controller 417.

The P-waveform generator 403 generates P-waveforms using L reserved tones that are previously appointed among positions of N sub-carriers. For example, a value of "1" (that is, 1+0j) is assigned to the L reserved tones among a total of the N tones, and a value of "0" (that is, a null value) is assigned to the remaining tones. An N-point IFFT operation is then performed to generate the P-waveform.

The reserved tones are determined by randomly selecting the L tones among the N tones, performing several hundred thousand to million times, the operation of producing the impulse waveform, and selecting a combination of the tones having the most ideal impulse waveform. The most ideal impulse waveform means a waveform whose point values ($p_1$, $p_2$, ..., $p_{N-1}$) except a maximum peak value ($p_0$) are closest to "0". That is, the waveform having the most ideal impulse characteristic is selected through the repetitive execution and the selected waveform is determined as the P-waveform.

The P-waveform generator 403 can generate the P-waveform in the above manner when necessary. Also, the P-waveform generator 403 can previously store information of P-waveform (N-point sample values) in a memory and output the P-waveform to the position mover 405 when necessary.

When the time-domain signal x outputted from the parallel to serial converter 209 shown in FIG. 2 is inputted to the multi-gradient algorithm unit, the peak detector 401 detects peaks that are greater than a predefined reference value among peaks of the inputted signal x, and then stores information (e.g., position, phase, magnitude) of the detected peaks in a memory. The stored information of the peaks is provided to the position mover 405, the phase rotator 407 and the scaler 409.

If information of a detected first peak is provided, the position mover 405 moves a peak of the P-waveform to a position of the first peak and outputs it to the phase rotator 407. The phase rotator 407 matches the phase of the moved P-waveform with the phase of the first peak detected on a complex plane. The scaler 409 scales the P-waveform outputted from the phase rotator 407 depending on magnitude of the first peak and then outputs a signal c. Here, the signal c is a calculated value that is optimized to remove the first peak. The scaled signal c is accumulated in the accumulator 411.

After the signal for removing the first peak is calculated, information of a second peak is provided to the position mover 405, the phase rotator 407, and the scaler 409. Then, the position mover 405 moves a peak of the P-waveform to a position of the second peak and outputs it to the phase rotator 407. The phase rotator 407 matches the phase of the moved P-waveform with the phase of the second peak detected on a complex plane. The scaler 409 scales the P-waveform outputted from the phase rotator 407 depending on magnitude of the second peak and then outputs a signal c. Here, the signal c is a calculated value that is optimized to remove the second peak. The scaled signal c is accumulated in the accumulator 411.

In the same manner, when the signal c for removing a last peak is stored in the accumulator 411, the accumulator 411 outputs the accumulated signal c to the complex adder 413. Here, the signal c outputted from the accumulator 411 is a value that is calculated to simultaneously remove the peaks from the output signal x of the IFFT unit 207.

The complex adder 413 outputs a signal x+c by complex addition of the signal x and the signal c, which are respectively outputted from the IFFT unit 207 and the accumulator 411. The PAPR calculator 415 calculates the PAPR of the signal x+c outputted from the adder 413. The controller 417 compares the calculated PAPR with a predefined target PAPR. When the calculated PAPR is greater than the target PAPR, the signal x+c is fed back to the peak detector 401 to repeat the multi-gradient algorithm. When the calculated PAPR is less than the target PAPR, the signal x+c is outputted as a transmit signal.

The above procedures are repeated until the transmit signal PAPR is below the predefined target PAPR. To prevent infinite repetition, the system sets the maximum number of times repetition may occur. Accordingly, when the above procedures are repeated the set number of times, the signal is outputted even though the transmit signal PAPR is not below the target PAPR.

Figure 5:
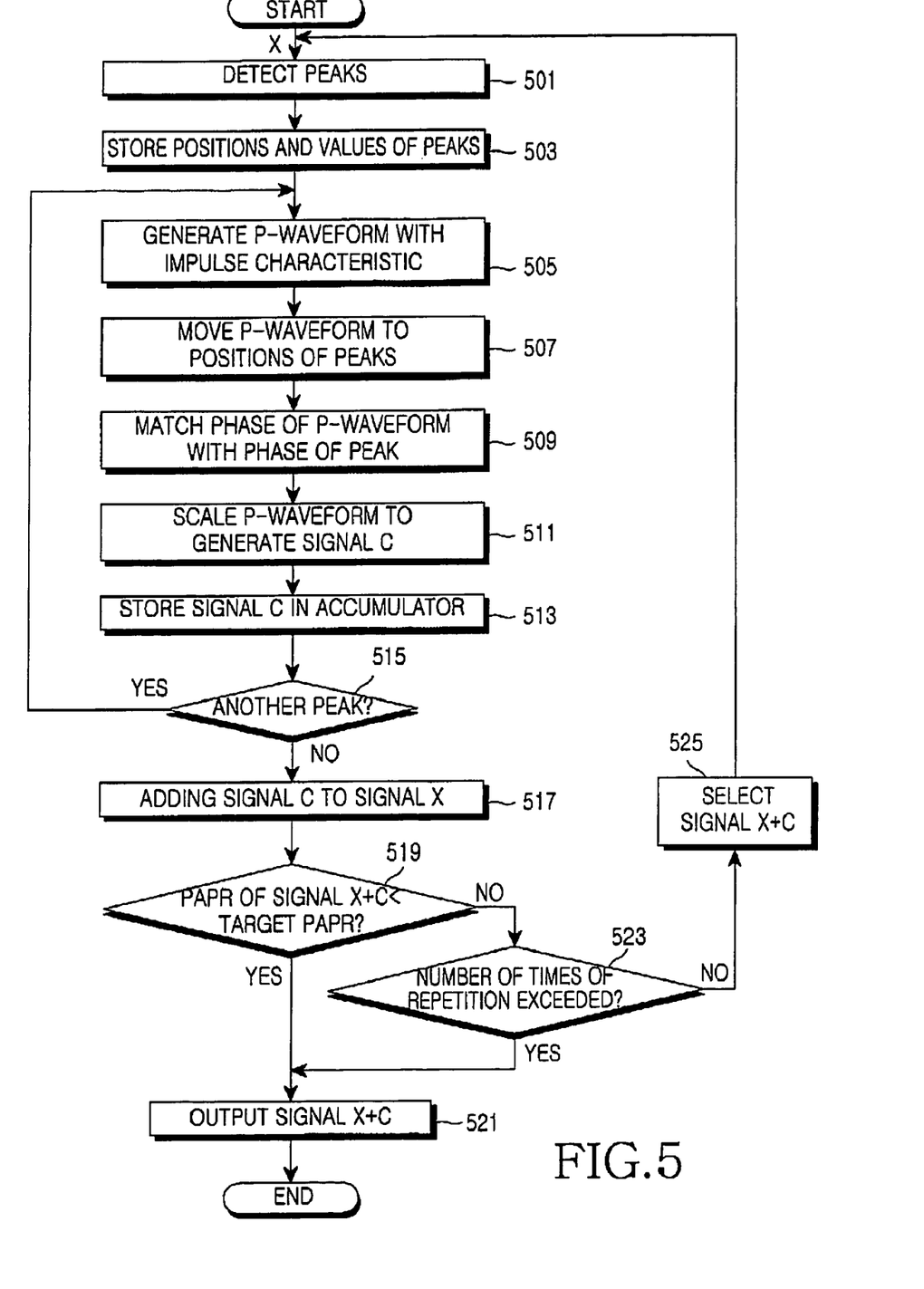
FIG. 5 is a flowchart of a multi-gradient algorithm according to an embodiment of the present invention.

FIG. 5 is a flowchart of a multi-gradient algorithm according to an embodiment of the present invention. The multi-gradient algorithm is executed in the multi-gradient algorithm unit of FIG. 4.

Referring to FIG. 5, in step 501, the multi-gradient algorithm unit detects peaks that are greater than the predefined reference value among the peaks of the time-domain signal x outputted from the ITTF unit. In step 503, the positions ($m_i$) of the detected peaks and the peak values ($x_{m_i}$) are stored in the memory.

In step 505, the P-waveform having the impulse characteristic is generated using the L reserved tones that are previously determined among the N tones (sub-carriers). The reserved tones are determined by randomly selecting the L tones among the N tones, repetitively performing the operation of producing the impulse waveform, and selecting a combination of the tones having the most ideal impulse waveform. Accordingly, the P-waveform may be referred to as the most ideal impulse waveform obtained through repetitive operations.

The multi-gradient algorithm unit can generate the P-waveform in the above manner at every operation. Also, the multi-gradient algorithm unit can use the P-waveform by reading the sample values of the P-waveform, which are previously stored, when necessary.

In step 507, after the P-waveform is obtained, the multi-gradient algorithm unit moves the peak of the P-waveform to the position ($m_1$) of the first peak by using the stored information of the peaks. The moved P-waveform is expressed as Equation (2):

$$p[((n-m_1))_N] \tag{2}$$

In step 509, the multi-gradient algorithm unit rotates the phase of the moved P-waveform by the phase of the first peak detected on the complex plane. The peak $p_0$ in the P-waveform has an ideal power of "1". Accordingly, the phase rotation can be achieved by complex product of $p_0$ and $$\frac{x_{m_1}}{|x_{m_1}|}.$$

In this manner, the phase of the peak $p_0$ is matched with the phase of the first peak.

In step 511, the multi-gradient algorithm unit calculates a signal $c^{(1)}$ by scaling the phase-rotated P-waveform depending on the magnitude of the first peak. The scaled signal $c^{(1)}$ is a calculated value that is optimized to remove the first peak. The signal $c^{(1)}$ scaled for reducing the magnitude of the first peak is expressed as Equation (3):

$$c^{(1)} = -\alpha_1 p[((n-m_1))_N] \qquad (3)$$

where, $m_1$ represents the position of the first peak exceeding the target level, and $\alpha_1$ represents the phase rotation and scaling value of the first peak.

$\alpha_1$ is expressed as Equation (4):

$$\alpha_1 = \frac{x_{m_1}}{|x_{m_1}|}(|x_{m_1}| - A)$$

where, A represents the predefined reference PAPR level, $$\frac{x_{m_1}}{|x_{m_1}|}$$

represents the phase rotation of the P-waveform, and $|x_{m_1}|-A$ represents the value for scaling the P-waveform.

In step 513, when the signal $c^{(1)}$ for clipping the first peak is calculated, the multi-gradient algorithm unit stores the calculated signal $c^{(1)}$ in the accumulator.

In step 515, the multi-gradient algorithm unit checks whether there is another peak to be clipped. If there is, the process returns to step 515. That is, the clipping signal $c^{(2)}$ for the second peak is calculated, and the signal c is calculated by accumulating the signal $c^{(2)}$ to the signal $c^{(1)}$.

On the contrary, when there is no additional peak to clip, the process proceeds to step S517. In step 517, the output signal x of the IFFT unit and the accumulated signal c are added to calculate the signal x+c. If the j number of peaks exceeding the reference value exists in the signal x, steps 505 to 513 are repeated j times. The resulting signal c and the signal x outputted from the IFFT unit are added to obtain the signal x+c, expressed as Equation (5):

$$x + c = x - \sum_{i=1}^{j} \alpha_i p[((n - m_i))_N] \qquad (5)$$

In step 519, the multi-gradient algorithm unit calculates the PAPR of the calculated signal x+c and compares the calculated PAPR with the predefined target PAPR. If the calculated PAPR is less than the target PAPR, the process proceeds to step 521. In step 521, the calculated signal x+c is determined as the transmit signal and the process is ended.

If the calculated PAPR is not less than the target PAPR, the process proceeds to step 523. In step 523, the multi-gradient algorithm unit checks whether the above procedures are repeated the predefined number of times. If the processes are repeated the predefined number of times, the process proceeds to step 521 of determining the calculated signal x+c as the transmit signal. Like this, if the transmit signal PAPR is not reduced to below the target PAPR even after the procedures are repeated the predefined number of times, the multi-gradient algorithm unit forces the process to end and transmits the finally calculated signal x+c.

If the number of times of repetition does not reach the predefined number of times, the process proceeds to step 525. In step 525, the signal x+c is determined as the signal x and the process returns to step 501.

Figure 6:
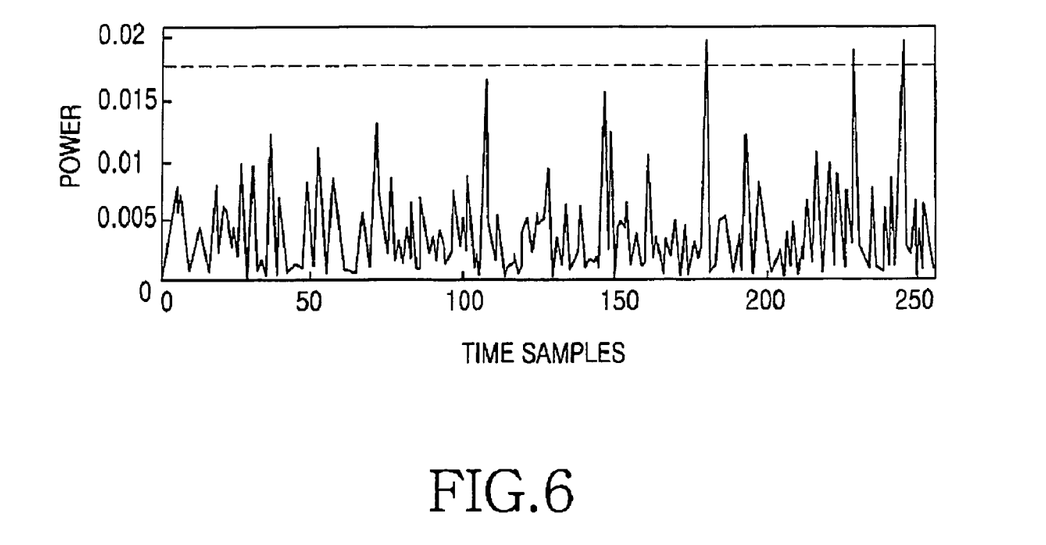
FIGS. 6 to 8 are waveforms produced when a multi-gradient algorithm according to an embodiment of the present invention is executed.
Figure 7A:
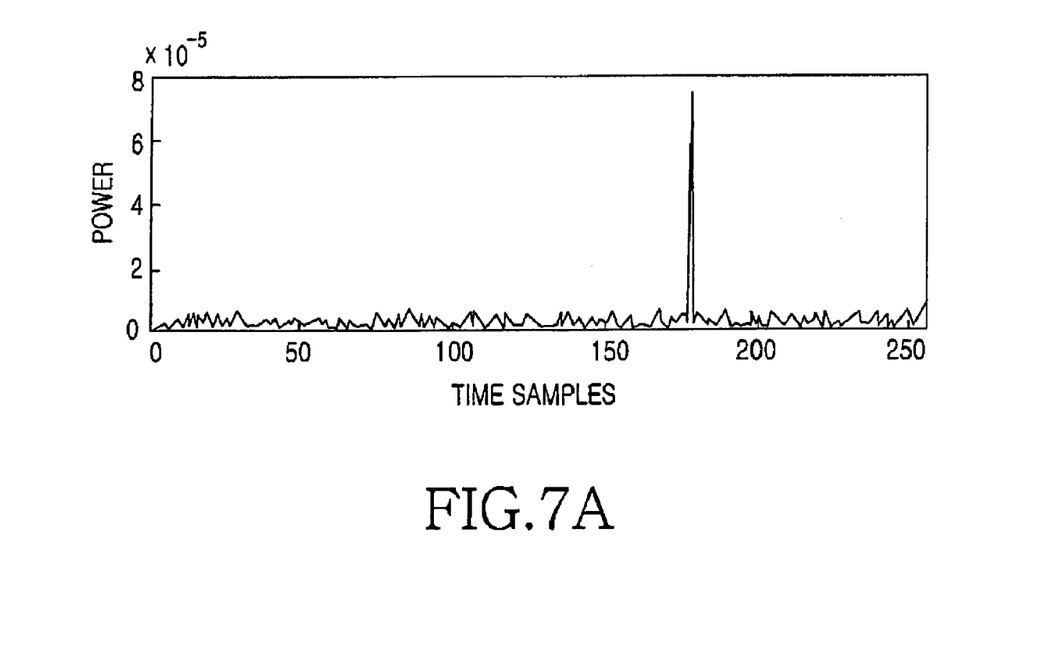
Figure 7B:
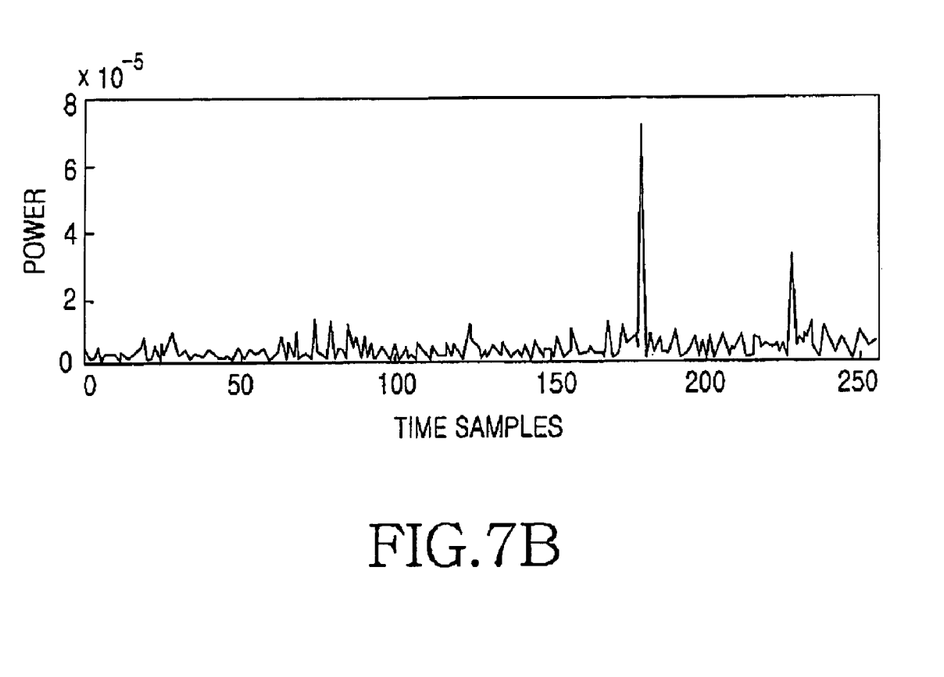
Figure 7C:
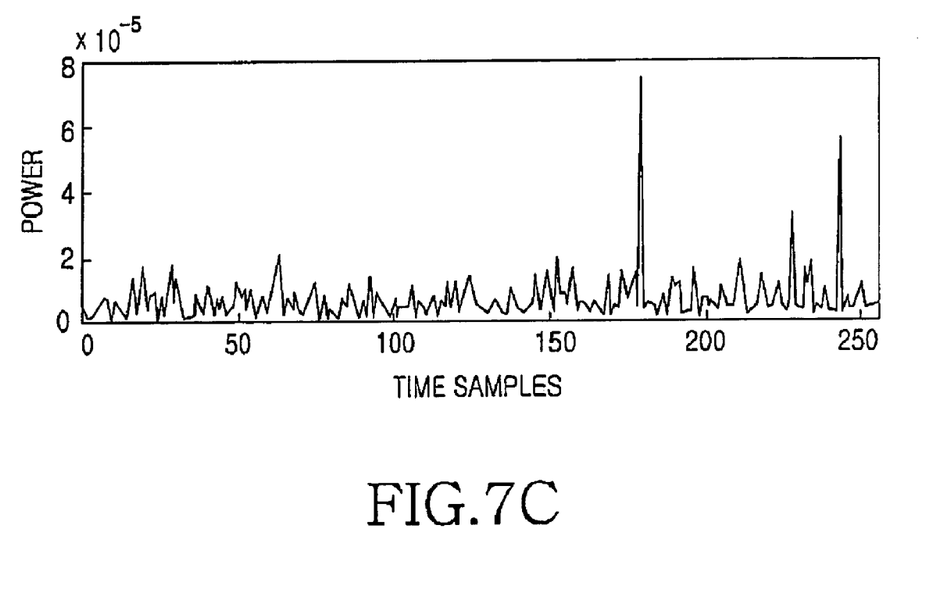
Figure 8:
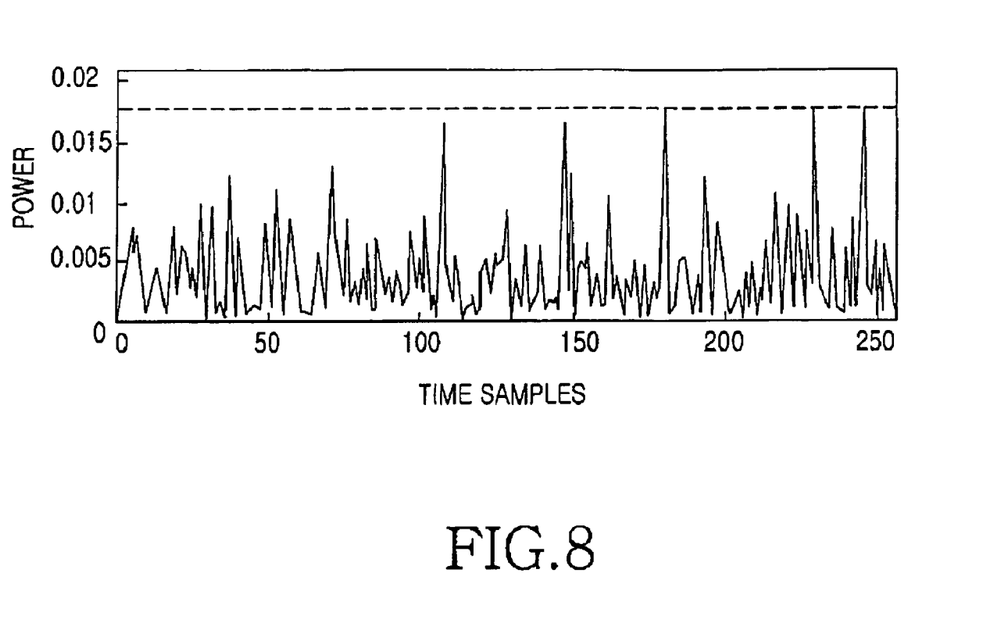

An exemplary application of the present invention will be described for the purpose of understanding the present invention more fully FIGS. 6 to 8 are waveforms produced when the multi-gradient algorithm is executed according to an embodiment of the present invention. In this test, a 256-point IFFT unit was used, twenty-six reserved tones were assigned, and a target PAPR was set to 7 dB. The target PAPR is only a value set for simulation and can change in an actual system implementation.

In FIGS. 6 to 8, the horizontal axis represents a sample index of 0-255 in time domain, and the vertical axis represents the IFFT unit output signal power. Assuming that the output signal of the IFFT unit is a complex signal in a form of a+bi (where, $i=\sqrt{-1}$), the vertical axis can be written as $a^2+b^2$.

FIG. 6 is a waveform of the output signal x of the IFFT unit. The peaks of the output signal x are detected according to the multi-gradient algorithm. As shown in FIG. 6, three peaks are greater than the target level of 7 dB. The number, the positions and the peak values (or, the magnitude and phase information) of the detected peaks are stored in the memory. In FIG. 6, the three peaks are respectively disposed at Nos. 181, 230 and 246, and the PAPRs of the three peaks are respectively 7.49 dB, 7.31 dB and 7.45 dB.

FIG. 7A is a waveform of the signal $c^{(1)}$ for clipping the first peak of the signal x. The signal $c^{(1)}$ is obtained by moving the peak of the impulse waveform (P-waveform) produced using the previously appointed reserved tones to the position of the first peak, rotating the phase of the moved P-waveform by the phase of the first peak, and scaling the phase-rotated P-waveform based on the magnitude of the first peak.

FIG. 7B is a waveform when the signal $c^{(2)}$ for clipping the second peak is accumulated to the waveform of FIG. 7A. The signal $c^{(2)}$ for clipping the second peak is obtained by moving the peak of the impulse waveform (P-waveform) to the position of the second peak, rotating the phase of the moved P-waveform by the phase of the second peak, and scaling the phase-rotated P-waveform based on the magnitude of the second peak.

FIG. 7C is a waveform when the signal $c^{(3)}$ for clipping the third peak is accumulated to the waveform of FIG. 7B. The signal $c^{(2)}$ for clipping the third peak is obtained by moving the peak of the impulse waveform (P-waveform) to the position of the third peak, rotating the phase of the moved P-waveform by the phase of the third peak, and scaling the phase-rotated P-waveform based on the magnitude of the third peak.

FIG. 8 is a waveform of the signal x+c produced by adding the waveform of FIG. 7C to the output signal x of the IFFT unit. As shown in FIG. 8, the PAPR of the signal x+c is 7.00 dB, so that it satisfies the target PAPR.

According to the TR scheme using the multi-gradient algorithm, the signals for clipping the peaks having more than the predefined value in the output signal of the IFFT unit are accumulatively stored and are added to the output signal of the IFFT unit. In this manner, the PAPR is reduced. The amount of computation required can be remarkably reduced because the peaks are clipped simultaneously.

As described above, since the conventional gradient algorithm repeats an operation of reducing one maximum peak to below the target level, the repetitive operations are performed the number times corresponding to the number of peaks exceeding the target level. On the contrary, the multi-gradient algorithm according to the present invention can simultaneously reduce the peaks exceeding the target level to below the target level. As a result, the amount of computation needed and the processing time can be remarkably reduced.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for reducing a PAPR (Peak-to-Average Power Ratio) of a transmit signal in a broadband wireless communication system, the apparatus comprising:
    a tone assignment unit for assigning information signals to remaining tones except L reserved tones that are previously appointed among N tones;
    an IFFT (Inverse Fast Fourier Transform) unit for performing an IFFT operation on the L reserved tones to which the information signals are not assigned and the (N-L) tones to which the information signals are assigned, and outputting the IFFT-ed signal to a multi-gradient algorithm unit; and
    the multi-gradient algorithm unit for detecting multiple peaks that are greater than a predefined reference value from an input signal generating a plurality of signals to remove the detected multiple peaks using a P-waveform having an impulse characteristic, accumulating the plurality of generated signals, and removing the peaks by adding the accumulated signal to the input signal at every iteration of detecting through removing the detected multiple peaks;
    a PAPR calculator for calculating PAPR of the signals output from the multi-gradient algorithm unit; and
    a controller for comparing the calculated PAPR with a predefined target PAPR,
    wherein if the calculated PAPR is less than the target PAPR, the controller outputs an output signal of the multi-gradient algorithm unit as a transmit signal, and
    wherein if the calculated PAPR is greater than the target PAPR, the controller feeds back the output signal of the multi-gradient algorithm unit to an input of the multi-gradient algorithm unit for a next iteration of detecting through removing the detected multiple peaks.

2. The apparatus of claim 1, wherein the multi-gradient algorithm unit includes:
    a peak detector for detecting the peaks that are greater than the predefined reference value from the IFFT unit;
    a position mover for moving a peak of the P-waveform having an impulse characteristic to positions of the detected peaks, the P-waveform being produced using the L reserved tones;
    a phase rotator for matching phases of the P-waveforms from the position with phases of the corresponding detected peaks;
    a scaler for scaling the P-waveforms outputted from the phase rotator depending on magnitudes of the corresponding peaks;
    an accumulator for generating a clipping signal by accumulating scaled signal output from the scaler; and
    an adder for simultaneously removing the detected peaks by complex addition of the clipping signals from the accumulator and the output signals of the IFFT unit.

3. The apparatus of claim 1, wherein if the calculated PAPR is greater than the target PAPR, the controller checks whether a number of times of the feedback reaches a predefined number of times, and
    if the number of times of the feedback reaches the predefined number of times, the controller outputs the output signal of the multi-gradient algorithm unit as the transmit signal.

4. The apparatus of claim 1, wherein the reserved tones are determined by selecting the L tones among the N tones, repetitively performing an operation of producing an impulse waveform, and selecting a combination of the tones having a most ideal impulse waveform.

5. The apparatus of claim 1, wherein the P-waveform is produced by assigning a value of 1 to the L reserved tones and a value of 0 to the remaining tones, and performing the IFFT operation on the tones.

6. The apparatus of claim 2, further comprising a P-waveform generator for storing sample values of the P-waveforms and providing the sample values of the P-waveforms to the position mover.

7. The apparatus of claim 2, wherein the phase rotator matches phase of the P-waveform with phase of the corresponding detected peak by complex product of a peak value of the P-waveform and $$\frac{x_{m_1}}{|x_{m_1}|},$$

where $x_{m_i}$ is a corresponding peak value.

8. A method for reducing a PAPR (Peak-to-Average Power Ratio) of a transmit signal in a broadband wireless communication, the method comprising the steps of:
    (1) assigning by the tone assignment unit information signals to remaining tones except L reserved tones that are previously appointed among N tones;
    (2) performing an IFFT operation on the L reserved tones to which the information signals are not assigned and the (N-L) tones to which the information signals are assigned and feeding the IFFT-ed signal to a step of detecting peaks;
    (3) detecting multiple peaks greater than a predefined reference value from an input signal, wherein multiple peaks are detected during each iteration of the step of detecting multiple peaks;
    (4) generating signals to remove the detected peaks using a P-waveform having an impulse characteristic;
    (5) accumulating the generated signals;
    (6) removing the detected peaks by adding the accumulated signal to the IFFT-ed signal;
    (7) calculating PAPR of the peak-removed signal;
    (8) comparing the calculated PAPR with a predefined target PAPR;

(9) if the calculated PAPR is less than the target PAPR, determining the peak-removed signal as a transmit signal; and (10) if the calculated PAPR is greater than the target PAPR, feeding back the peak-removed signal to the detecting multiple peaks step for a next iteration of steps (3) through (10).

9. The method of claim 8, wherein the step of removing the detected peaks includes the steps of:

detecting the peaks that are greater than the predefined reference value from the IFFT-ed signal;

generating a plurality of P-waveforms by moving peaks of a P-waveform having an impulse characteristic to positions of the detected peaks, the P-waveform being produced using the L reserved tones;

matching phases of the plurality of moved P-waveforms with phases of the corresponding detected peaks;

scaling the plurality of phase-matched P-waveforms depending on magnitudes of the corresponding peaks;

generating a clipping signal for simultaneously removing the detected peaks by accumulating the plurality of scaled signals; and removing the detected peaks by complex addition of the clipping signals and the IFFT-ed signal.

10. The method of claim 8, wherein the step of feeding back the peak-removed signal includes the steps of:

if the calculated PAPR is greater than the target PAPR, checking whether a number of times of the feedback reaches a predefined number of times;

if the number of times of the feedback does not reach the predefined number of times, feeding back the peak-removed signal to the detecting peaks step to remove peaks of the peak-removed signal; and if the number of times of the feedback reaches the predefined number of times, determining the peak-removed signal as the transmit signal.

11. The method of claim 8 wherein the reserved tones are determined by selecting the L tones among the N tones, repetitively performing the operation of producing an impulse waveform, and selecting a combination of the tones having a most ideal impulse waveform.

12. The method of claim 8, wherein the P-waveform is produced by assigning a value of 1 to the L reserved tones and a value of 0 to the remaining tones, and performing the IFFT operation on the tones.

13. The method of claim 9, wherein phase of the P-waveform is matched with phase of the corresponding detected peak by complex product of a peak value of the P-waveform and $$\frac{x_{m_1}}{|x_{m_1}|},$$

where $x_{m_i}$ is a corresponding peak value.

* * * * *

UNITED STATES PATENT AND TRADEMARK OFFICE
CERTIFICATE OF CORRECTION

PATENT NO. : 7,583,738 B2
APPLICATION NO. : 11/111217
DATED : September 1, 2009
INVENTOR(S) : Yun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 858 days.

Signed and Sealed this

Fourteenth Day of September, 2010

David J. Kappos
*Director of the United States Patent and Trademark Office*